(12) United States Patent
Kim

(10) Patent No.: US 12,388,482 B2
(45) Date of Patent: *Aug. 12, 2025

(54) MAGNETIC MOUNT FOR ELECTRONIC DEVICES

(71) Applicant: SPIGEN KOREA CO., LTD., Seoul (KR)

(72) Inventor: Dae-Young Kim, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,674

(22) Filed: Dec. 11, 2023

(65) Prior Publication Data

US 2024/0113740 A1    Apr. 4, 2024

Related U.S. Application Data

(60) Continuation of application No. 17/443,183, filed on Jul. 22, 2021, now Pat. No. 11,863,223, which is a division of application No. 16/581,596, filed on Sep. 24, 2019, now Pat. No. 11,101,838, which is a (Continued)

(51) Int. Cl.
*H04B 1/3888* (2015.01)
*A45C 11/00* (2006.01)
*A45C 13/10* (2006.01)
*H02J 7/00* (2006.01)
*H02J 50/10* (2016.01)
*H04B 1/3877* (2015.01)

(52) U.S. Cl.
CPC ............ *H04B 1/3888* (2013.01); *A45C 11/00* (2013.01); *A45C 13/1069* (2013.01); *H02J 7/0042* (2013.01); *H02J 50/10* (2016.02); *A45C 11/002* (2025.01); *A45C 11/003* (2025.01); *H04B 1/3877* (2013.01)

(58) Field of Classification Search
CPC .......... H02J 50/10; H02J 50/005; H02J 50/70; H02J 7/025; H02J 5/005; H01F 27/2885; H01F 38/14; H04M 1/185; H04B 5/0037; H04B 5/0081; H04B 5/0093
See application file for complete search history.

(56) References Cited

U.S. PATENT DOCUMENTS

| | | |
|---|---|---|
| 8,188,826 B2 | 5/2012 | Okada et al. |
| 8,746,448 B1 | 6/2014 | Bellace |
| 9,025,317 B2 | 5/2015 | Richardson et al. |

(Continued)

*Primary Examiner* — Cindy Trandai
(74) *Attorney, Agent, or Firm* — Bridgeway IP Law Group, PLLC; Jihun Kim

(57) ABSTRACT

A case for an electronic device wherein the electronic device has a receiver coil for wireless charging and the receiver coil is formed in between an inner circle and an outer circle, includes: a hard protective frame constructed to receive the electronic device therein wherein the hard protective frame faces the electronic device; and a metal plate constructed to be received in the recess. The metal plate is constructed to enable magnetic retention or attachment of the case to a support having a magnet. The metal plate has a rounded concave edge, and the metal plate does not overlap with the inner circle. Preferably, the rounded concave edge, the inner circle, and the outer circle are substantially symmetrical with respect to a same line.

12 Claims, 21 Drawing Sheets

Related U.S. Application Data continuation of application No. 15/989,033, filed on May 24, 2018, now Pat. No. 10,469,119.

(60) Provisional application No. 62/511,280, filed on May 25, 2017.

(56) References Cited

U.S. PATENT DOCUMENTS

| | | | |
|---|---|---|---|
| 9,084,343 B2 | 7/2015 | Waffenschmidt | |
| 9,484,769 B2 | 11/2016 | Kim | |
| 9,486,910 B2 | 11/2016 | Stevens et al. | |
| 9,842,688 B2 | 12/2017 | Kurs et al. | |
| 10,291,058 B2 | 5/2019 | Kato et al. | |
| 2010/0018315 A1 | 1/2010 | Wang et al. | |
| 2010/0261499 A1* | 10/2010 | Sip | H05K 1/0239 361/796 |
| 2011/0050164 A1 | 3/2011 | Partovi et al. | |
| 2011/0148352 A1 | 6/2011 | Wang et al. | |
| 2011/0192857 A1 | 8/2011 | Rothbaum et al. | |
| 2011/0228458 A1 | 9/2011 | Richardson et al. | |
| 2012/0146576 A1* | 6/2012 | Partovi | H02J 7/0044 320/108 |
| 2012/0151973 A1 | 6/2012 | Cheung | |
| 2012/0235636 A1 | 9/2012 | Partovi | |
| 2013/0229148 A1* | 9/2013 | Khan | H04B 5/72 320/108 |
| 2013/0300220 A1 | 11/2013 | Weiss | |
| 2014/0062799 A1 | 3/2014 | Sutherland et al. | |
| 2014/0321052 A1 | 10/2014 | Diebel et al. | |
| 2014/0354218 A1 | 12/2014 | Kaynar et al. | |
| 2015/0048752 A1 | 2/2015 | Van Den Brink et al. | |
| 2015/0111621 A1 | 4/2015 | Smith | |
| 2015/0123604 A1 | 5/2015 | Lee et al. | |
| 2015/0214749 A1 | 7/2015 | Park et al. | |
| 2015/0222018 A1 | 8/2015 | Kumura et al. | |
| 2016/0003270 A1 | 1/2016 | Franklin | |
| 2016/0056664 A1 | 2/2016 | Partovi | |
| 2016/0119036 A1 | 4/2016 | Yang et al. | |
| 2016/0236626 A1 | 8/2016 | Yialamas | |
| 2016/0241046 A1 | 8/2016 | Lee et al. | |
| 2016/0294427 A1* | 10/2016 | Wojcik | H04B 1/3888 |
| 2016/0318455 A1 | 11/2016 | Zhang et al. | |
| 2016/0344224 A1* | 11/2016 | Hong | H02J 50/10 |
| 2016/0352151 A1 | 12/2016 | Standke et al. | |
| 2017/0026498 A1 | 1/2017 | Goldfain et al. | |
| 2017/0035172 A1 | 2/2017 | Kim | |
| 2017/0062999 A1 | 3/2017 | Thiers | |
| 2017/0063128 A1 | 3/2017 | Van Bosch et al. | |
| 2017/0077727 A1 | 3/2017 | Kim et al. | |
| 2017/0098952 A1 | 4/2017 | Winkler | |
| 2017/0098958 A1* | 4/2017 | Yio | H01F 38/14 |
| 2017/0117085 A1 | 4/2017 | Mao et al. | |
| 2017/0155418 A1 | 6/2017 | Kim | |
| 2017/0170678 A1 | 6/2017 | Uhm | |
| 2017/0264725 A1 | 9/2017 | Holder | |
| 2017/0338676 A1 | 11/2017 | Yan | |
| 2018/0069294 A1 | 3/2018 | Kang et al. | |
| 2018/0109132 A1 | 4/2018 | Cho et al. | |
| 2018/0166905 A1 | 6/2018 | Park et al. | |
| 2018/0343025 A1 | 11/2018 | Kim | |

\* cited by examiner

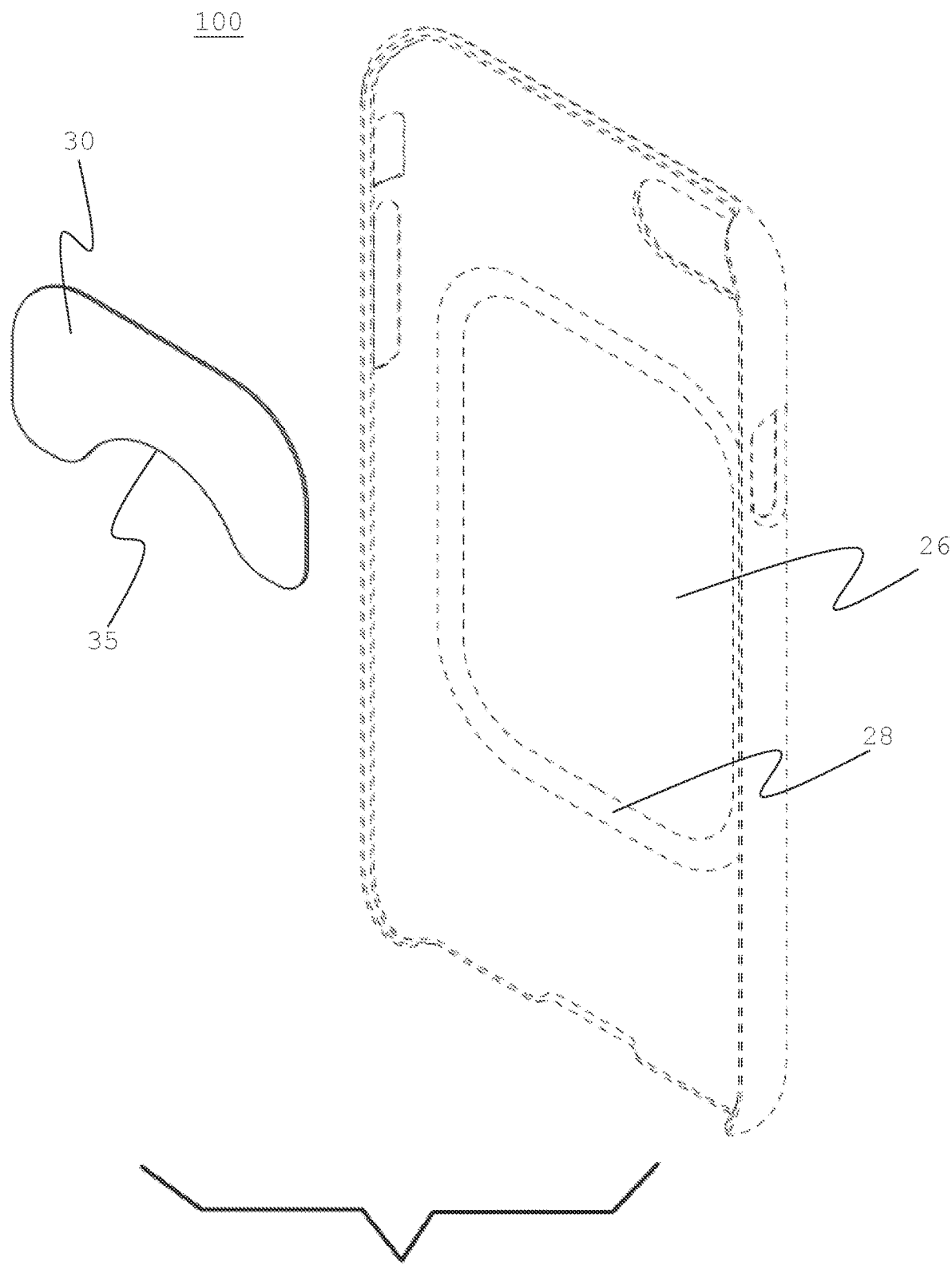

100

30

FIG. 4A
FIG. 4B
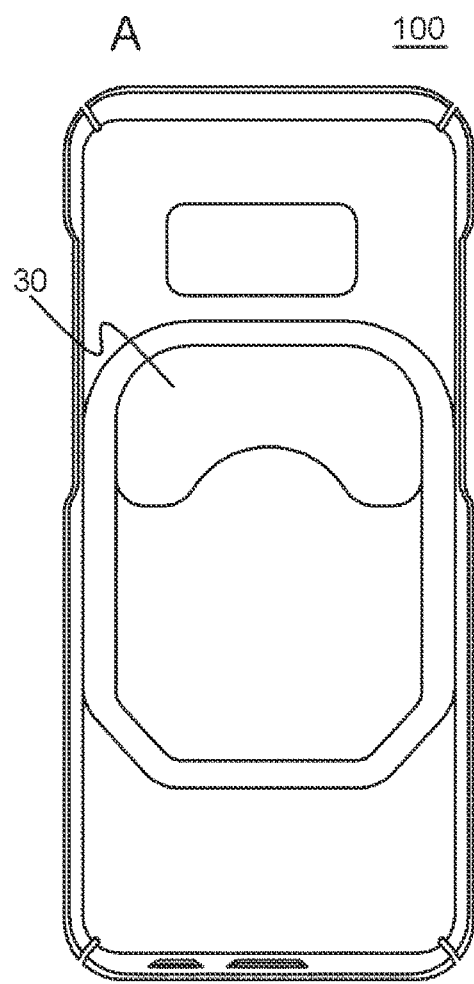
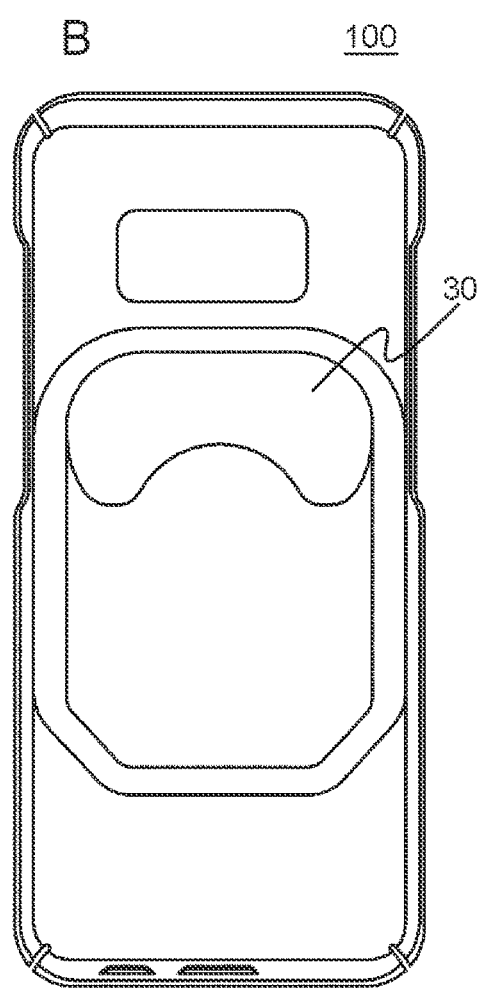

Receiver circuit or receiver coil 310

No case   Using the case of FIG. 4B   Using the case of FIG. 4C

170~250mA          90~230mA              40~180mA
Avg. 210mA         Avg. 190mA            Avg. 80mA

MAGNETIC MOUNT FOR ELECTRONIC DEVICES

CROSS-REFERENCE TO RELATED APPLICATIONS

This application is a Continuation Application of and claims priority to U.S. patent application Ser. No. 17/443,183 filed on Jul. 22, 2021, which is a Divisional application of and claims priority to U.S. patent application Ser. No. 16/581,596 filed on Sep. 24, 2019 and patented as the U.S. Pat. No. 11,101,838 on Aug. 24, 2021, which is a Continuation application of and claims priority to U.S. patent application Ser. No. 15/989,033 filed on May 24, 2018 and patented as U.S. Pat. No. 10,469,119 on Nov. 5, 2019, which claims priority to U.S. Provisional Patent Application No. 62/511,280, filed on May 25, 2017, the disclosures of which are incorporated herein by reference in their entirety.

FIELD OF THE INVENTION

The present invention relates to a case having a metal plate for magnetically mounting the case with an electronic device installed therein to a support having a magnet, and more particularly, to a metal plate having a rounded concave edge.

BACKGROUND OF THE INVENTION

A magnetic mount for an electronic device such as a smart phone, cellular phone, mobile phone, tablet computing device, etc. has been introduced. A mobile phone mount has magnetically attractable members, one of which is installed in a case and the other of which is installed in a support. The support supports the case so that the case stands or the support can be mounted on an air vent of a vehicle. Such magnetic mount for electronic devices is disclosed in the U.S. patent application Ser. No. 15/359,465, filed on Nov. 22, 2016, the disclosure of which is incorporated herein by reference in its entirety. The magnetically attractable members are usually a metal plate and a magnet, and the metal plate is attached to an electronic device or a case.

However, such metal plate may impede or prevent wireless charging of a cell phone because the metal plate blocks electromagnetic field for wireless charging. Wireless charging uses an electromagnetic field to transfer energy between two objects through electromagnetic induction, and FIG. 5A illustrates how it works using the transmitter coil and the receiver circuit. Since the metal plate blocks the electromagnetic field, it substantially impedes or prevents wireless charging of an electronic device.

This invention is directed to solve this problem.

SUMMARY OF THE INVENTION

The present invention contrives to solve the disadvantages of the prior art. The present invention provides a metal plate, having a rounded concave edge, for magnetically mounting a case for an electronic device.

The object of the present invention is to provide a case for an electronic device wherein the electronic device has a receiver coil for wireless charging and the receiver coil is formed in between an inner circle and an outer circle, comprising: a hard protective frame constructed to receive the electronic device therein wherein the hard protective frame has a recess which faces the electronic device; and a metal plate constructed to be received in the recess. The metal plate is constructed to enable magnetic retention or attachment of the case to a support having a magnet. The metal plate has a rounded concave edge, and the metal plate does not overlap with the inner circle. Preferably, the rounded concave edge, the inner circle, and the outer circle are substantially symmetrical with respect to a same line.

Another object of the present invention is to provide a metal plate for magnetically mounting a case for an electronic device wherein the electronic device has a receiver coil for wireless charging and the receiver coil is formed in between an inner circle and an outer circle, the metal plate comprising: a rounded concave edge. The metal plate is constructed to be attachable to the case. The metal plate is constructed to enable magnetic retention or attachment of the case to a support having a magnet, and the metal plate does not overlap with the inner circle. Preferably, the rounded concave edge, the inner circle, and the outer circle are substantially symmetrical with respect to a same line.

The advantages of the present invention are: (1) the metal plate of the present invention helps a case with an electronic device installed therein magnetically attracted and retained by the support having a magnet, and at the same time, the case having the metal plate does not substantially impede or prevent wireless charging of the electronic device; (2) the metal plate does not substantially impede or prevent wireless charging of the electronic device, and thus a user does not have to remove the metal plate for wireless charging; and (3) the convenience and ease to charge wirelessly electronic device installed in the case having the metal plate for magnetic attachment of the electronic device to a magnetic support, or the electronic device with the installed metal plate, from any number of orientations and positions of the metal plate despite the possibility of interference or disruption of wireless charging by the metal plate. Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 2A is the view before the metal plate is attached to a case;

FIGS. 4A-C show the metal plates of FIGS. 3A through 3C, respectively, attached to the case;

DETAILED DESCRIPTION EMBODIMENTS OF THE INVENTION

Figure 1A:
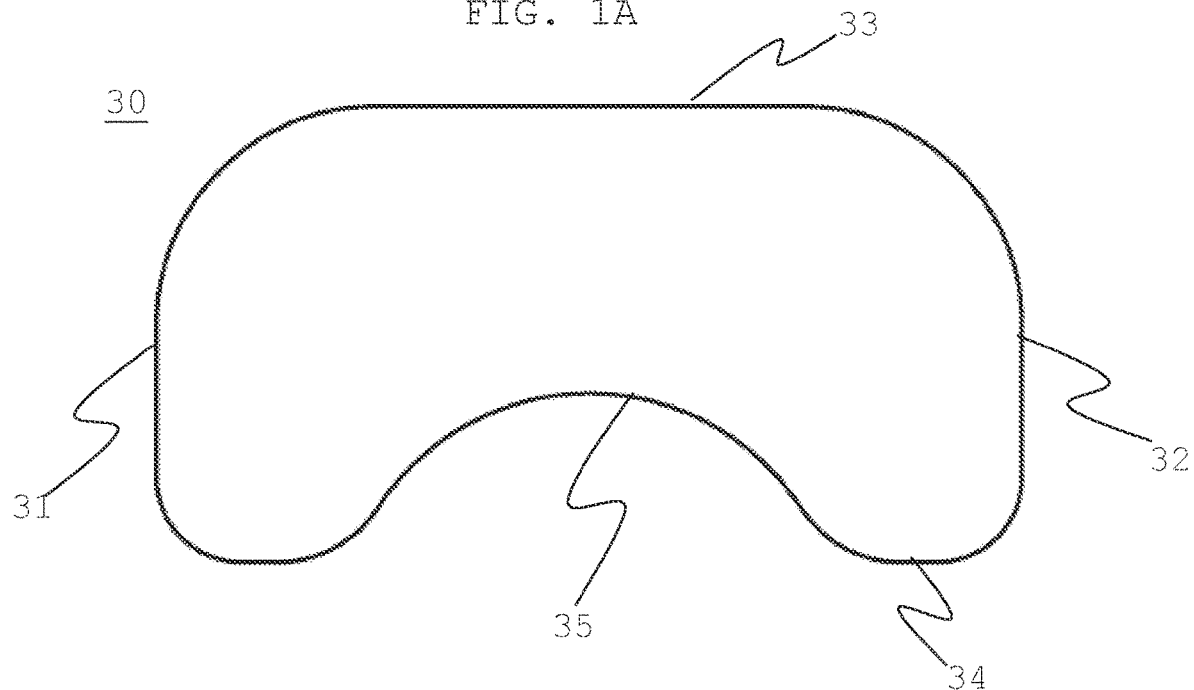
FIGS. 1A-D are front view, rear view, front perspective view, and rear perspective view of the metal plate according to the present invention.

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

FIGS. 1A-D are front view, rear view, front perspective view, and rear perspective view of the metal plate (30) according to the present invention. FIG. 2A is the view before the metal plate (30) is attached to a case (100), and FIG. 2B is the view where the metal plate (30) is attached to the case (100).

The case (100) for an electronic device (300) wherein the electronic device (300) has a receiver coil (310) for wireless charging and the receiver coil (310) is formed in between an inner boundary (320) and an outer boundary (330), comprises: a hard protective frame (20) constructed to receive the electronic device (300) therein wherein the hard protective frame (20) has a recess (26) which faces the electronic device (300); and a metal plate (30) constructed to be received in the recess (26) of the hard protective frame (20). The metal plate (30) is constructed to enable magnetic retention or attachment of the case (100) to a support (40) having a magnet (50).

The metal plate (30) is made of ferromagnetic material. The metal plate (30) has a rounded concave edge (35), and the metal plate (30) does not overlap with the inner boundary (320). Here, "overlap" means when the metal plate (30) and the inner boundary (320) are viewed from the front, they do not overlap as illustrated in FIG. 6B.

Figure 3A:
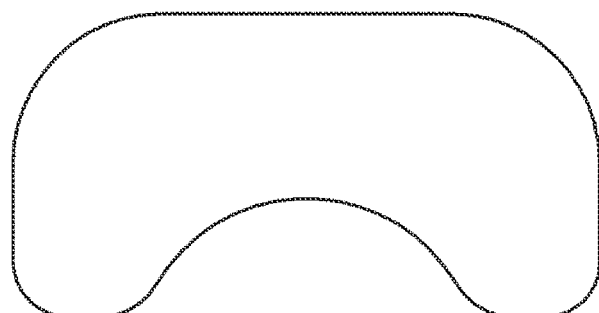
FIGS. 3A through 3C show alternative shapes of the metal plate.
Figure 3B:
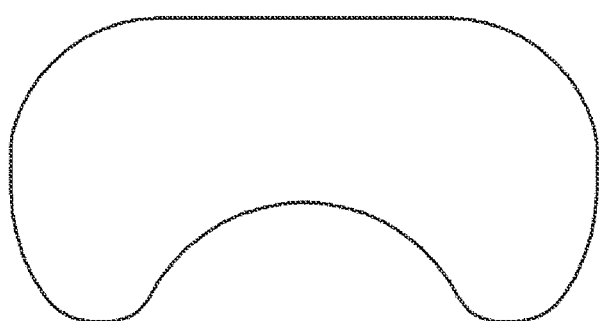
Figure 3C:
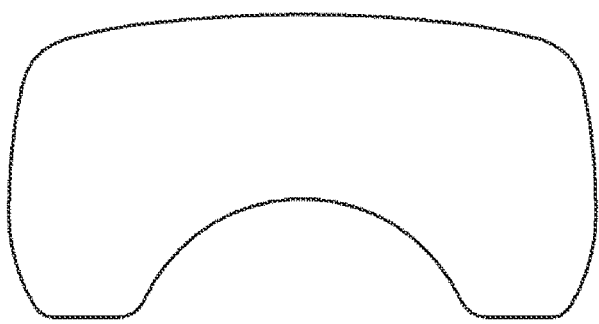

The rounded concave edge (35) may be circular, elliptical, substantially circular, or substantially elliptical, including the rounded concave edge (35) formed by a smoothly curved line. Both ends of the rounded concave edge (35) may be rounded the other way as shown in FIGS. 3A through 3C.

The case (100) may be made of a hard protective frame (20) alone, a soft protective cover (10) alone, or combination thereof. In any structure, the metal plate (30) is attached to the case (100). Preferably, the soft protective cover (10) is made of thermoplastic polyurethane and the hard protective frame (20) is made of polycarbonate. Preferably, the inner boundary (320) and the outer boundary (330) are circular as in FIG. 5B. Alternatively, the inner boundary (320) and the outer boundary (330) may be rectangular with rounded corners as in FIG. 5B.

Figure 6A:
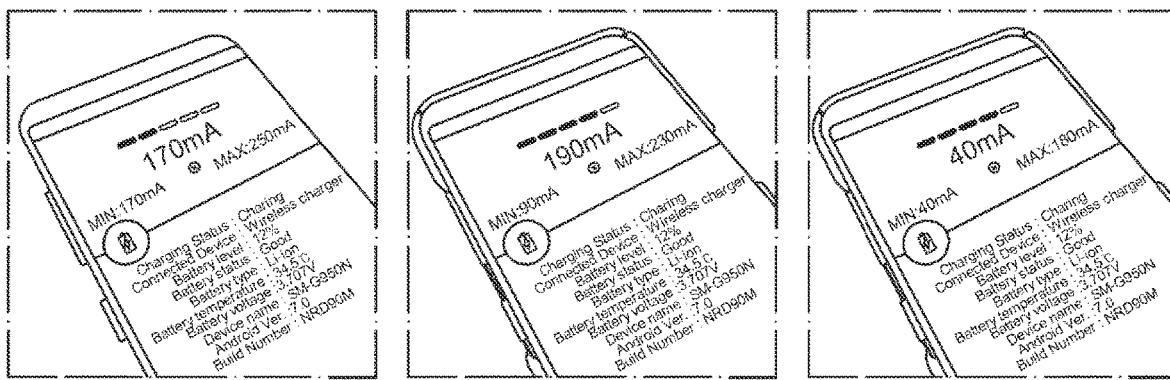
FIG. 6A shows test results related to wireless charging.
Figure 6B:
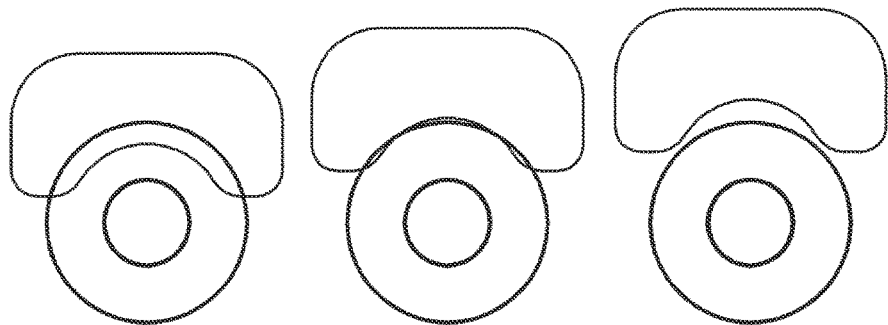
FIG. 6B shows various positions of the metal plate relative to the receiver coil of the electronic device.

As illustrated in FIG. 6B, when the metal plate (30) is attached to the case (100) and the electronic device (300) is installed in the case (100), the rounded concave edge (35), the inner boundary (320), and the outer boundary (330) are substantially symmetrical with respect to the same line. The inner boundary (320) and the outer boundary (330) are generally concentric, and the rounded concave edge (35) may or may not be concentric as well.

FIG. 6B shows various relative locations between the metal plate (35) and the boundaries (320, 330). The rounded concave edge (35) may be placed in between the inner boundary (320) and the outer boundary (330). Alternatively, the rounded concave edge (35) may overlap with the outer boundary (330). Or, the rounded concave edge (35) may be placed outside the outer boundary (330).

As in FIGS. 1A-D, the metal plate (30) may be substantially rectangular with one side (34) having the rounded concave edge (35). In addition, the metal plate (30) may have rounded corners, preferably, all four corners are rounded. In FIG. 1A, sides (31, 32) are substantially parallel to each other and sides (33, 34) are substantially parallel to each other as well.

In the alternative embodiment as in FIG. 3B, the metal plate (30) may be substantially trapezoidal wherein the rounded concave edge (35) is formed on a shorter side (34) of two parallel sides (33, 34). In addition, the metal plate (30) may have rounded corners, preferably, all four corners are rounded.

Figure 4C:
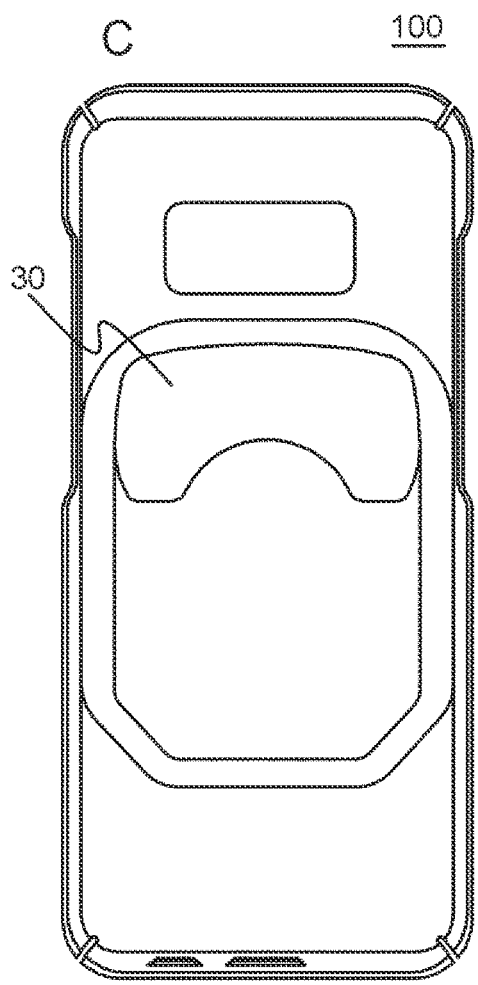

FIGS. 3A, 3B and 3C show alternative designs of the metal plate (30), and FIGS. 4A, 4B and 4C show them attached to the case (100).

The metal plate (30) is attached to the hard protective frame (20) by an adhesive (37). Preferably, the adhesive (37) is a double-sided adhesive.

Figure 1B:
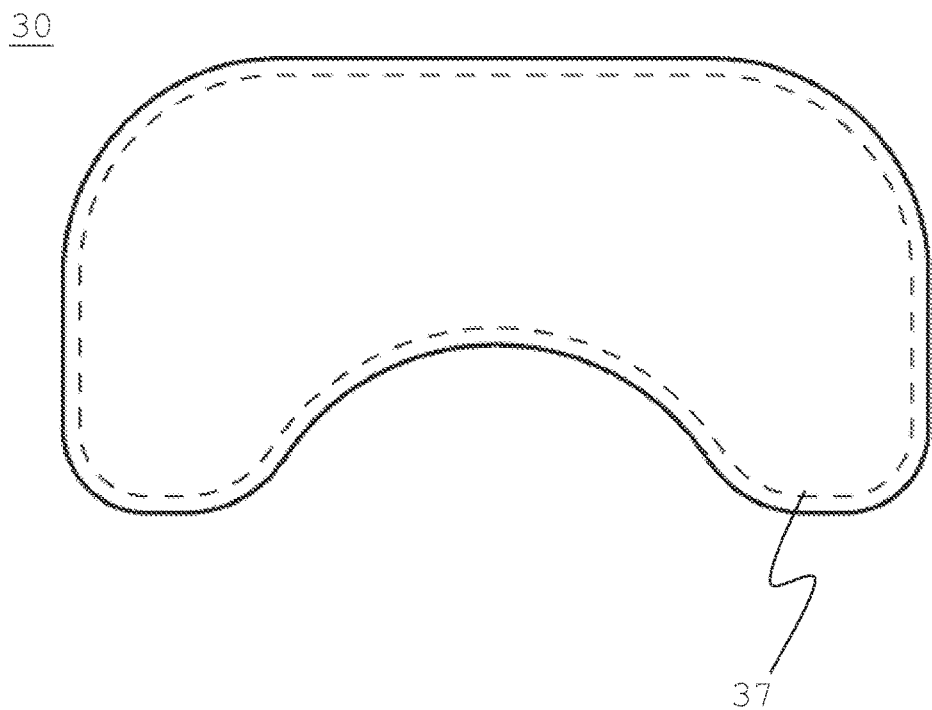
Figure 1C:
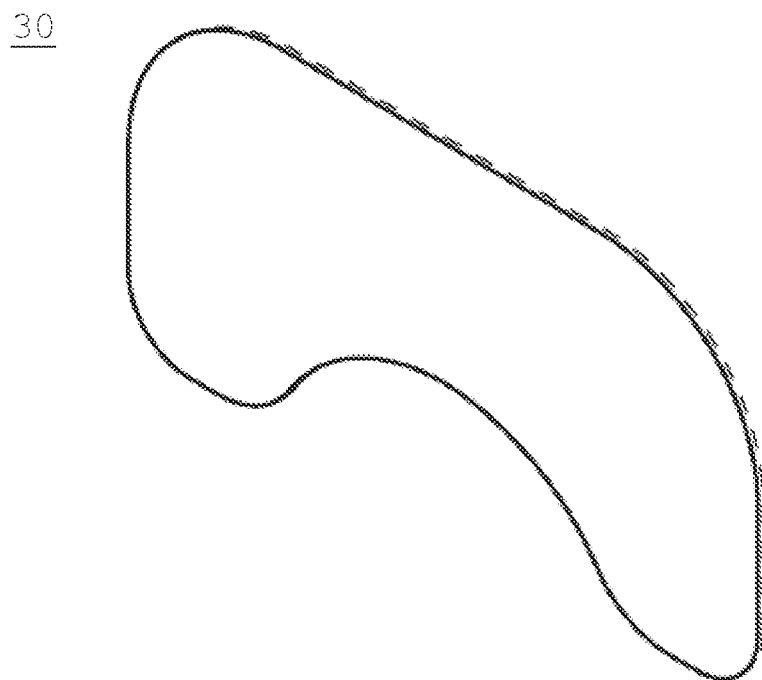
Figure 1D:
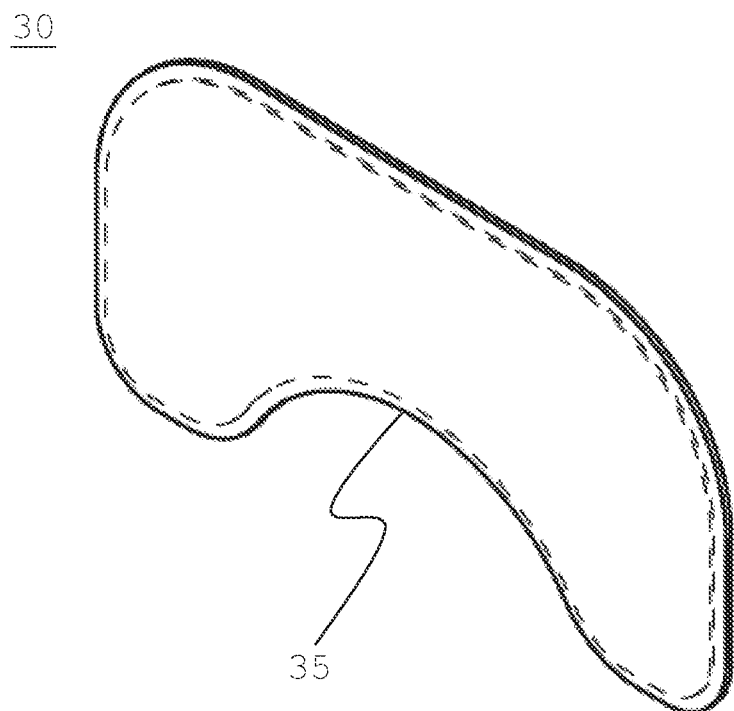
Figure 2B:
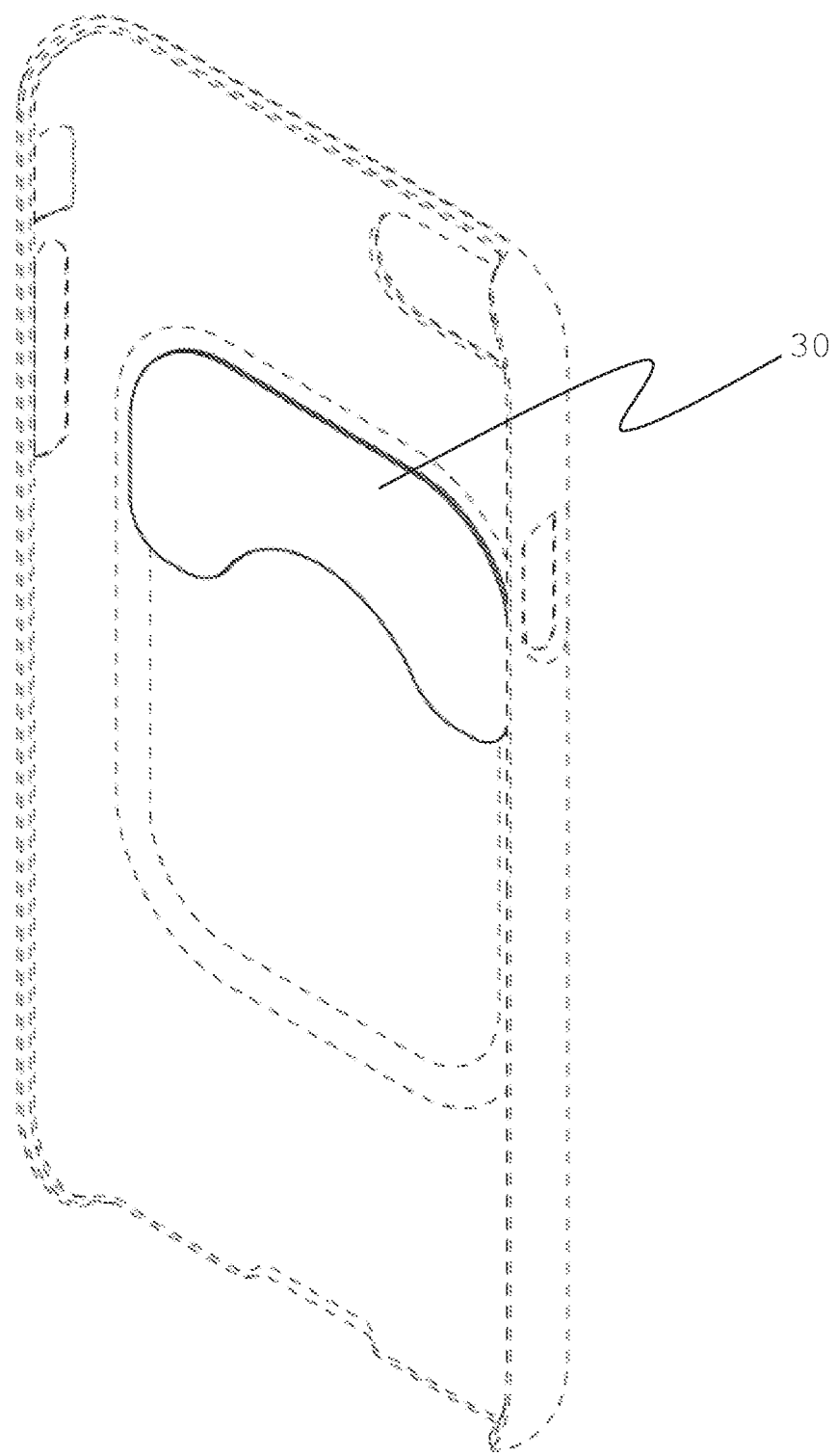
FIG. 2B is the view where the metal plate is attached to the case.

As in FIG. 1B, the metal plate (30) may have an adhesive layer covered with transparent film. A user may remove the transparent film and attach the adhesive layer to the case (100). The hard protective frame (20) may further comprise a surrounding recess (28) which surrounds the recess (26) and gradually recesses from a flat surface (23) of the hard protective frame (20) to the recess (26).

The case, having the hard protective frame (20), may further comprises a soft protective cover (10) which comprises a back panel (12) to cover a back portion of the electronic device (300), and a side wall (14) extending from a top surface (11) of the back panel (12) along edges (13) of the back panel (12).

In the alternative embodiment, a metal plate (30) for magnetically mounting an electronic device (300) or a case (100) with an electronic device (300) installed therein wherein the electronic device (300) has a receiver coil (310) for wireless charging and the receiver coil (310) is formed in between an inner boundary (320) and an outer boundary (330), the metal plate (30) comprising: a rounded concave edge (35).

The metal plate (30) is constructed to be attachable to the electronic device (300) or the case (100). The metal plate (30) is constructed to enable magnetic retention or attachment of the electronic device (300) to a support (40) having a magnet (50), and the metal plate (30) attached to the electronic device (300) or the case (100) is constructed not to substantially block magnetic waves passing through the area formed by the inner boundary.

The metal plate (30) may be directly attached to the electronic device (300) or to the case (100) for magnetically mounting the electronic device (300) to a support (40). Alternatively, the metal plate (30) may be attached to the electronic device (300) which is then installed in the case (100).

Figure 5A:
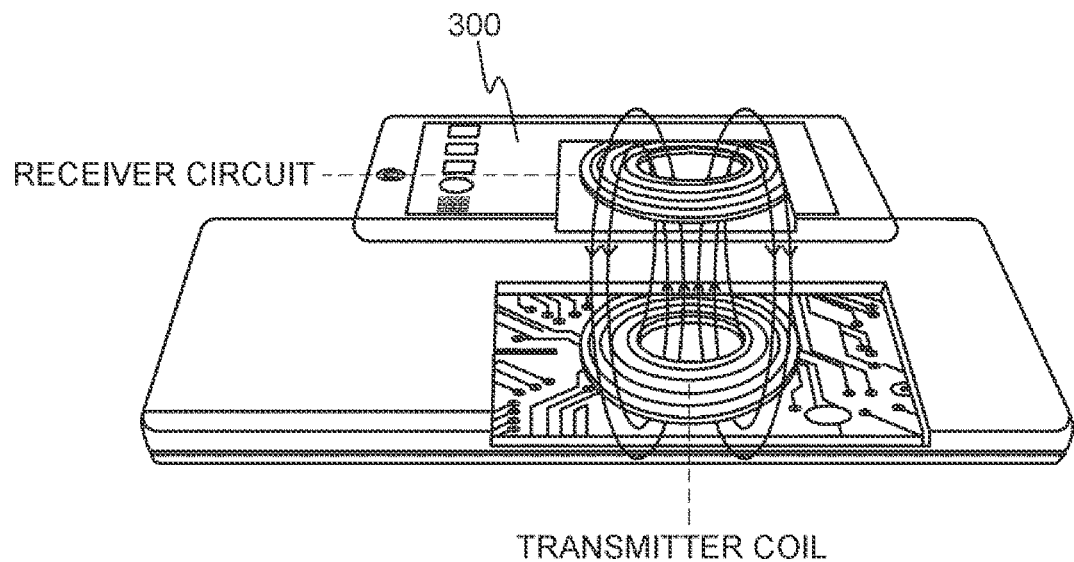
FIG. 5A shows a schematic drawing to illustrate how wireless charging works using the transmitter coil and receiver circuit (receiver coil)
Figure 5B:
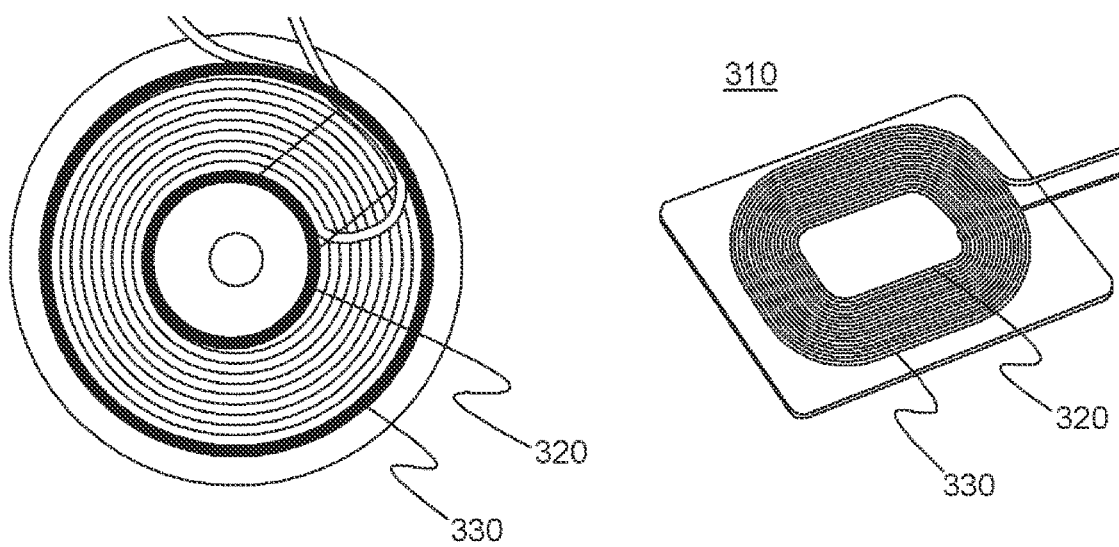
FIG. 5B shows the receiver circuit or receiver coil.

As illustrated in FIG. 5B, the inner boundary (320) and the outer boundary (330) are substantially circular, or substantially rectangular with rounded corners.

The rounded concave edge (35) substantially symmetrically aligns to respective orthographic parallel projections of the inner boundary (320) and the outer boundary (330) onto a projection plane of the metal plate (30).

The rounded concave edge (35) may be placed in between the inner boundary (320) and the outer boundary (330). Alternatively, the rounded concave edge (35) at least partially overlaps with an orthographic parallel projection of the outer boundary (330) onto a projection plane of the metal plate (30). Or, the rounded concave edge (35) may be placed outside an orthographic parallel projection of the outer boundary (330) onto a projection plane of the metal plate (30).

The metal plate (30) is substantially rectangular with a first side (34) having the rounded concave edge (35), and the metal plate (30) has rounded corners. The metal plate (30) has third and fourth sides (31, 32) that are substantially parallel to each other and has a second side (33) that is substantially parallel to the first side (34). Alternatively, the metal plate (30) may be substantially trapezoidal, wherein the rounded concave edge (35) is formed on a shorter side (34) of two parallel sides (33, 34), and wherein the metal plate (30) has rounded corners.

The metal plate (30) may further comprise an adhesive layer (37). The adhesive may be glue, bond, paste, tape, double-sided adhesive, or the like known in the art, but preferably, the adhesive is a double-sided adhesive. The double-sided adhesive may be a double-sided adhesive tape or sheet where one side of the adhesive tape can affix onto the metal plate (30) and the other side can be used to affix onto the case or electronic device thereby coupling the metal plate (30) with case or electronic device. Typically, the side of the double-sided adhesive tape used to affix the metal plate (30) onto the case or electronic device is initially covered by a release tape that is removable by the user when ready to affix or attach the metal plate (30) to either the electronic device (300) or the case (100) for magnetically mounting the electronic device (300) to a support (40). The metal plate (30) may be attached to the recess of the case, or the metal plate (30) may be attached to outer side of the case or directly to the electronic device.

Table 1 shows data from the wireless charging of an electronic device having a receiver circuit already installed therein, as also shown in FIG. 6A. The current driven by the wireless charging (transmitter coil as shown in FIG. 5A) is reported by the electronic device. The first column of table 1 contains data on the wireless charging of an electronic device having a receiver circuit installed therein without a metal plate (30) and without being attached to a case. The current shown by the electronic device during wireless charging ranged from 170 mA to 250 mA with an average charging current of 210 mA. The second and third columns contain data on the wireless charging of an electronic device having a receiver circuit installed therein with the electronic device being reversibly attached to cases having a metal plate (30) affixed in the manner as shown in FIGS. 4B and 4C respectively. For the case of FIG. 4B with the affixed metal plate (30), the charging current as displayed on the electronic device is 90 mA to 230 mA with an average charging current of 190 mA. For the case of FIG. 4C with the affixed metal plate (30), the charging current as displayed on the electronic device is 40 mA to 180 mA with an average charging current of 80 mA. Thus, even with the case having the metal plate (30), the wireless charging for the electronic device affixed therein is still very effective.

TABLE 1

| | Wireless Charging | | |
| --- | --- | --- | --- |
| | No Case | FIG. 4B | FIG. 4C |
| Charging Current Range | 170-250 mA | 90-230 mA | 40-180 mA |
| Avg Charging Current | 210 mA | 190 mA | 80 mA |

The metal plate (30) of the present invention helps a case with an electronic device installed therein that is magnetically attracted and retained by the support having a magnet, and at the same time, the case having the metal plate (30) does not substantially impede or prevent wireless charging of the electronic device. In addition, the metal plate does not substantially impede or prevent wireless charging of the electronic device, and thus a user does not have to remove the metal plate for wireless charging.

Below is the description of the invention disclosed in the U.S. patent application Ser. No. 15/359,465, filed on Nov. 22, 2016, the disclosure of which is incorporated herein by reference in its entirety.

Figure 7:
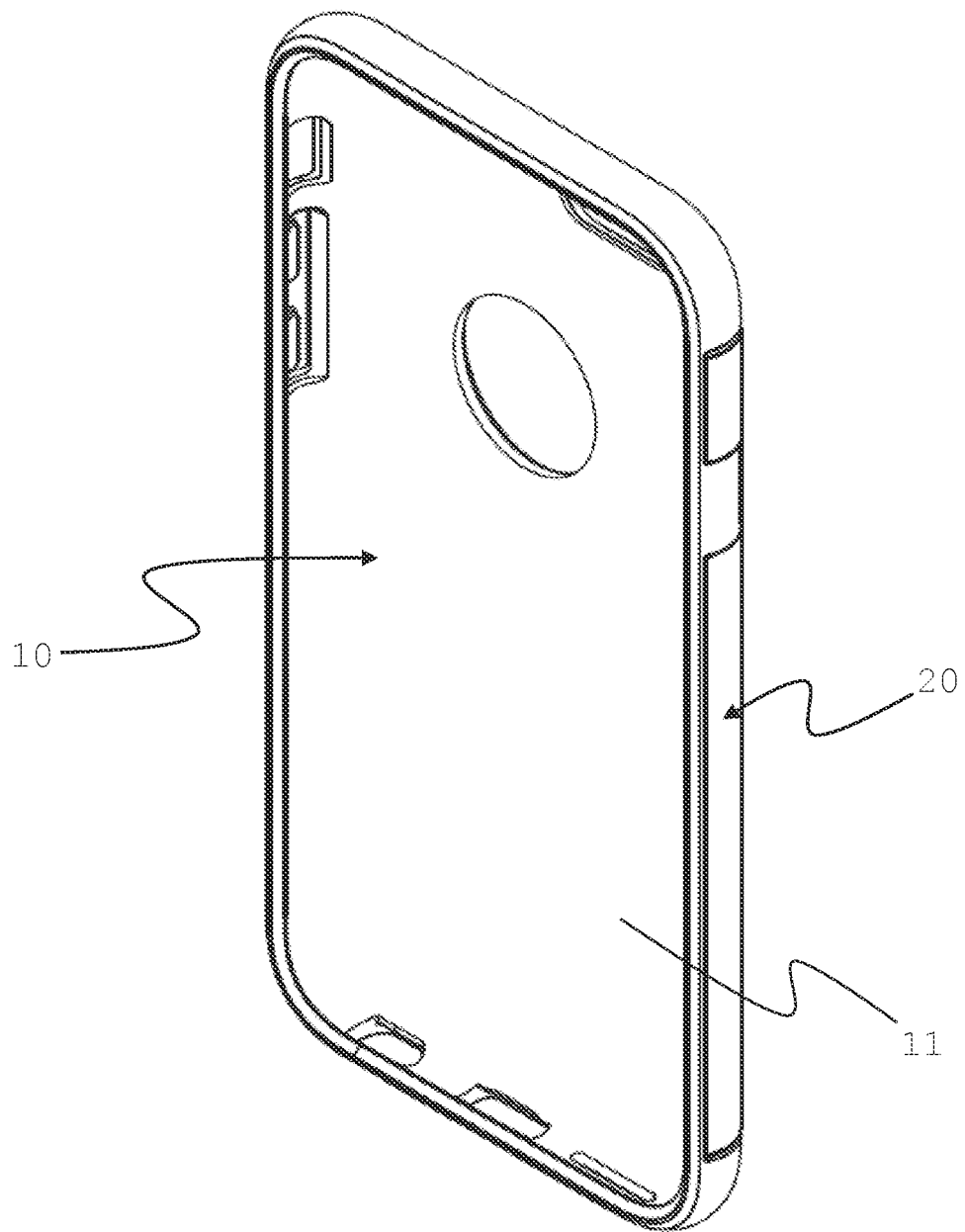
FIG. 7 shows a front perspective view of a case according to the invention for magnetic mount.
Figure 8:
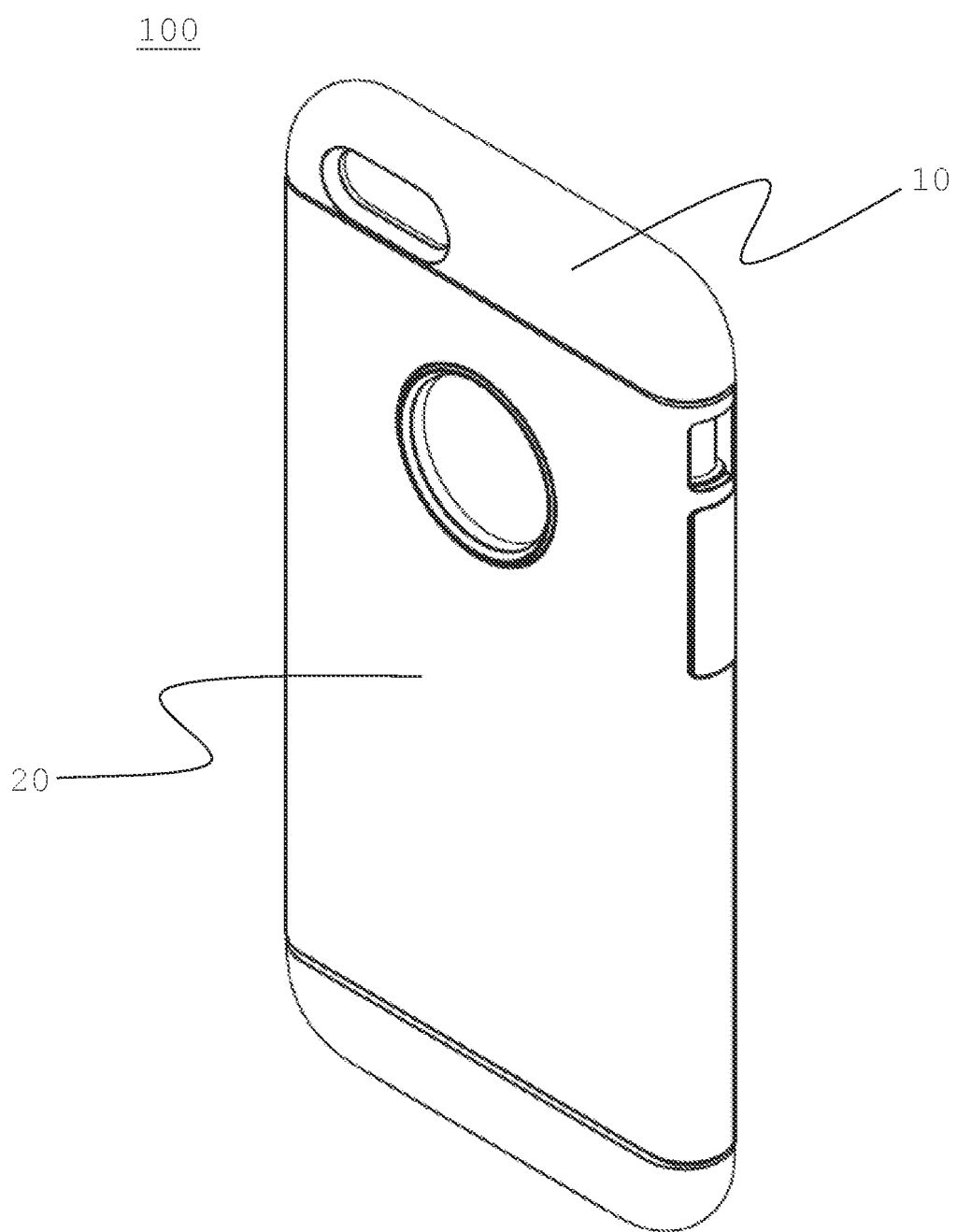
FIG. 8 shows a rear perspective view of the case according to the invention for magnetic mount.
Figure 9:
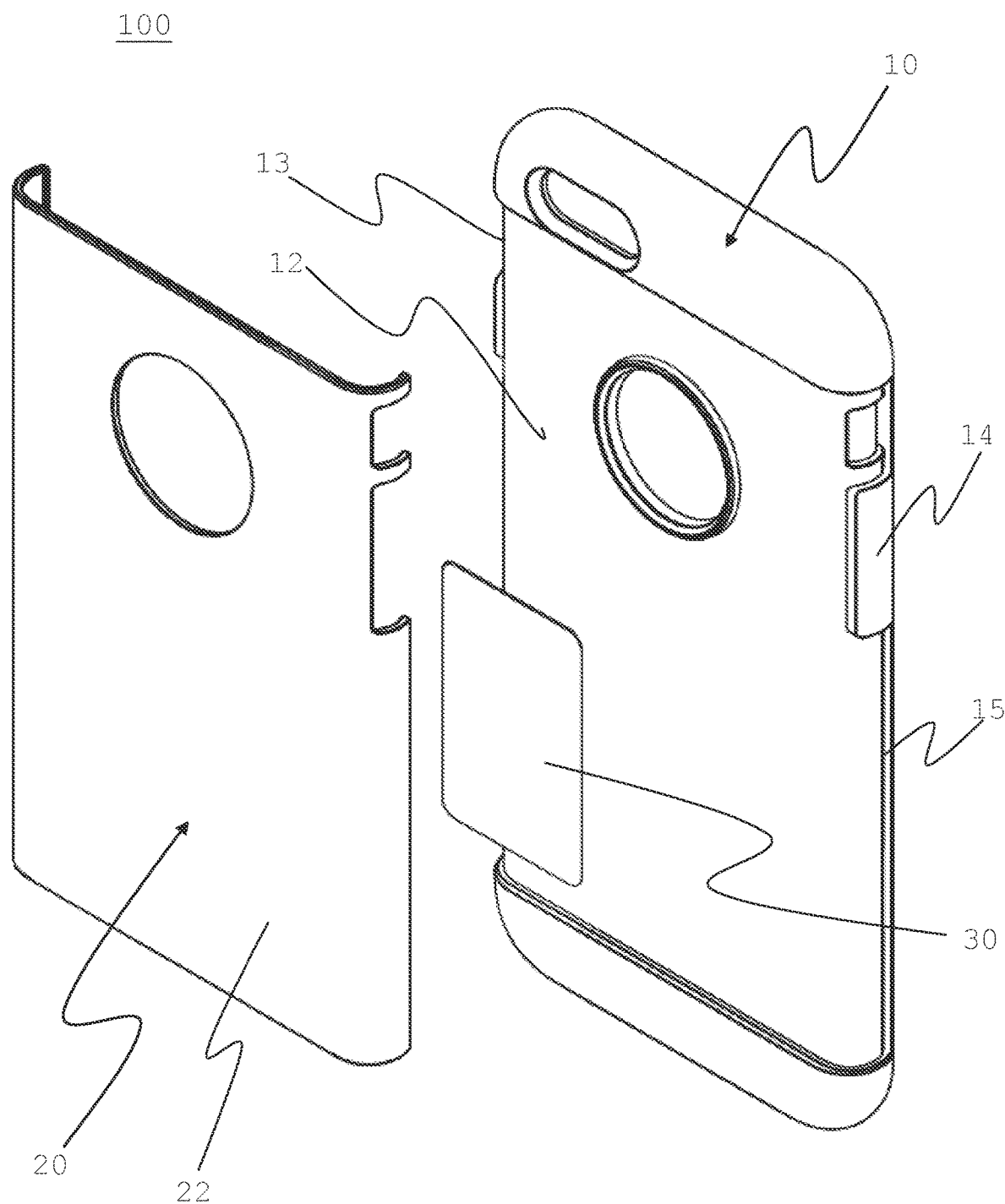
FIG. 9 shows an exploded view of the case having a soft protective cover, a hard protective frame and a metal plate according to the invention for magnetic mount.

FIGS. 7 and 8 respectively show front and rear perspective views of a case (100) according to the present invention. FIG. 9 shows an exploded view of the case (100) having a soft protective cover (10), a hard protective frame (20) and a metal plate (30).

A magnetic mount (200) of the present invention for an electronic device (300) comprises: a case (100) and a support (40). The case (100) comprises a soft protective cover (10) which comprises a back panel (12) to cover a back portion of the electronic device (300), and a side wall (14) extending from a top surface (11) of the back panel (12) along edges (13) of the back panel (12); a hard protective frame (20) constructed to removably mount over the soft protective cover (10); and a metal plate (30) placed between the soft protective cover (10) and the hard protective frame (20). The support (40) has a magnet (50). In addition, the metal plate (30) and magnet (50) are magnetically attractable to each other for magnetically attracting and retaining the case (100) to the support (40).

Figure 10:
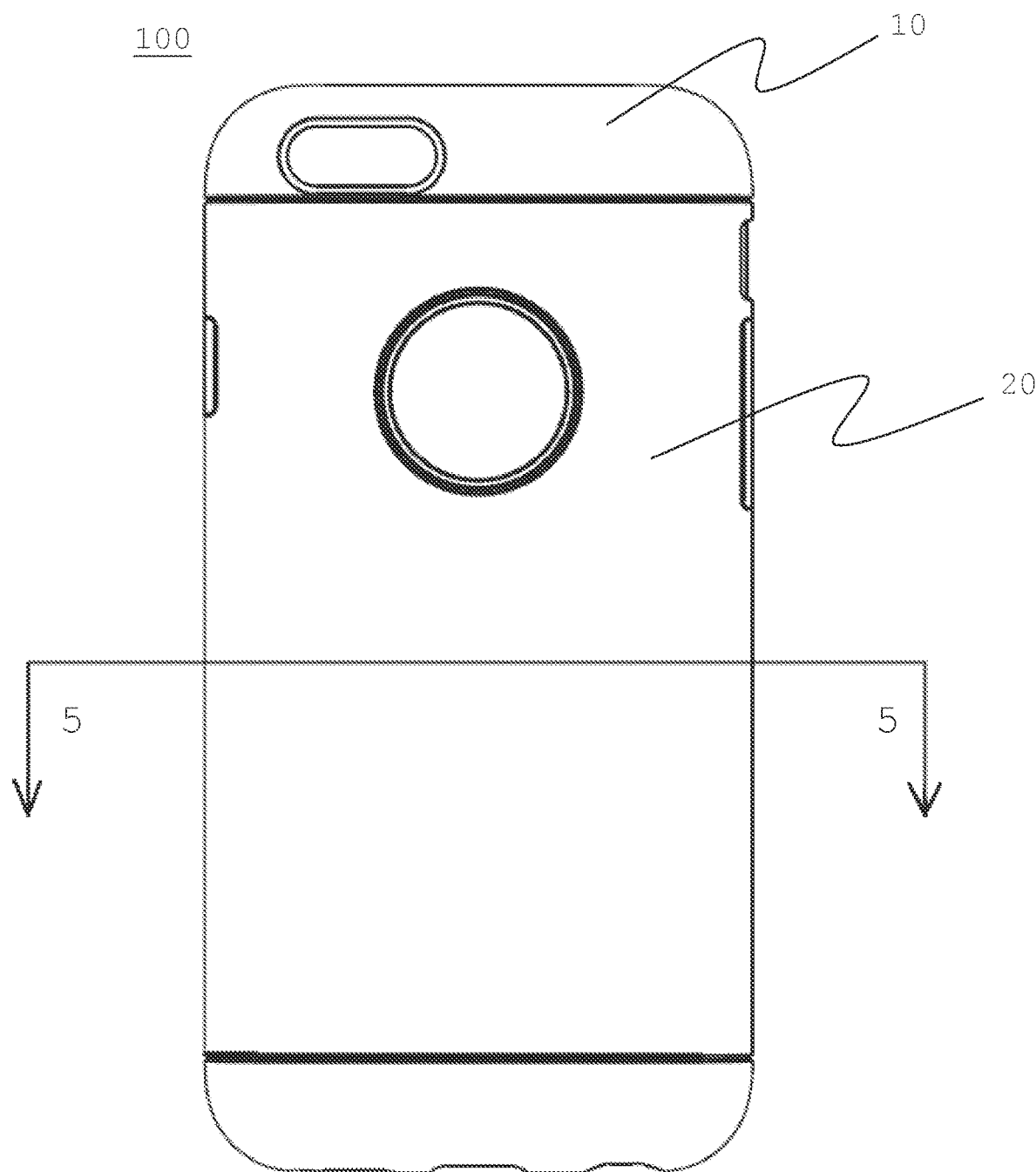
FIG. 10 shows a rear view of the case according to the invention for magnetic mount.
Figure 11:
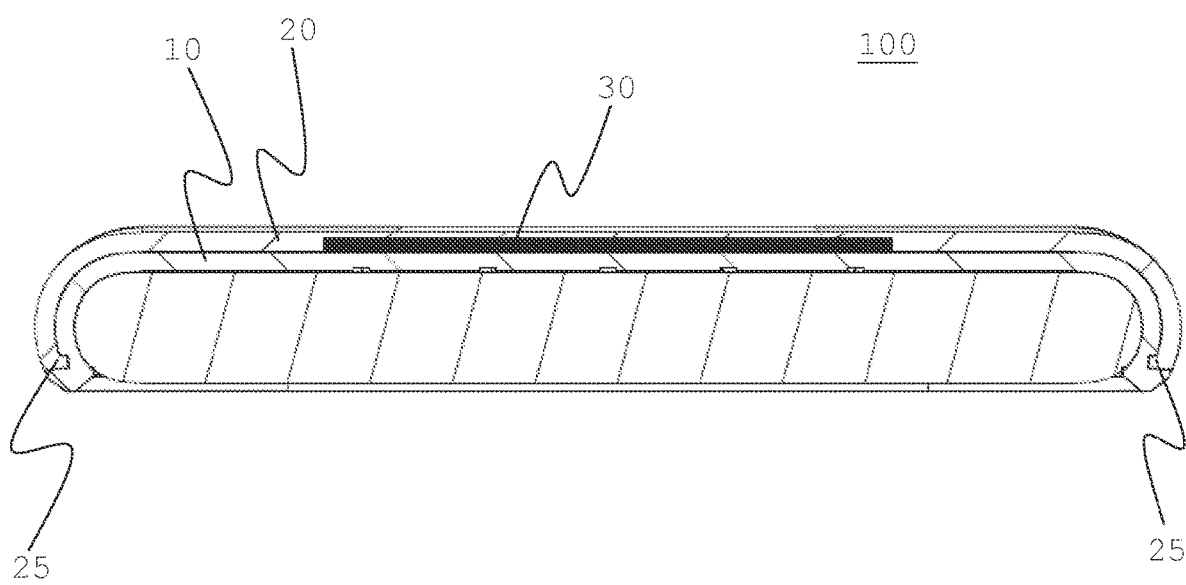
FIG. 11 shows a cross sectional view of FIG. 10.

FIG. 10 shows a rear view of the case (100) and FIG. 11 shows a cross sectional view of FIG. 10.

The soft protective cover (10) may have a recess (not shown) formed on the back panel (12) to receive the metal plate (30). In the alternative as shown in FIG. 11, the hard protective frame (20) may have a recess to receive the metal plate (30). Or, the soft protective cover (10) may have a first recess formed on the back panel (12) and the hard protective frame (20) may have a second recess such that the first and second recesses form a housing to receive the metal plate (30) therein.

Figure 12:
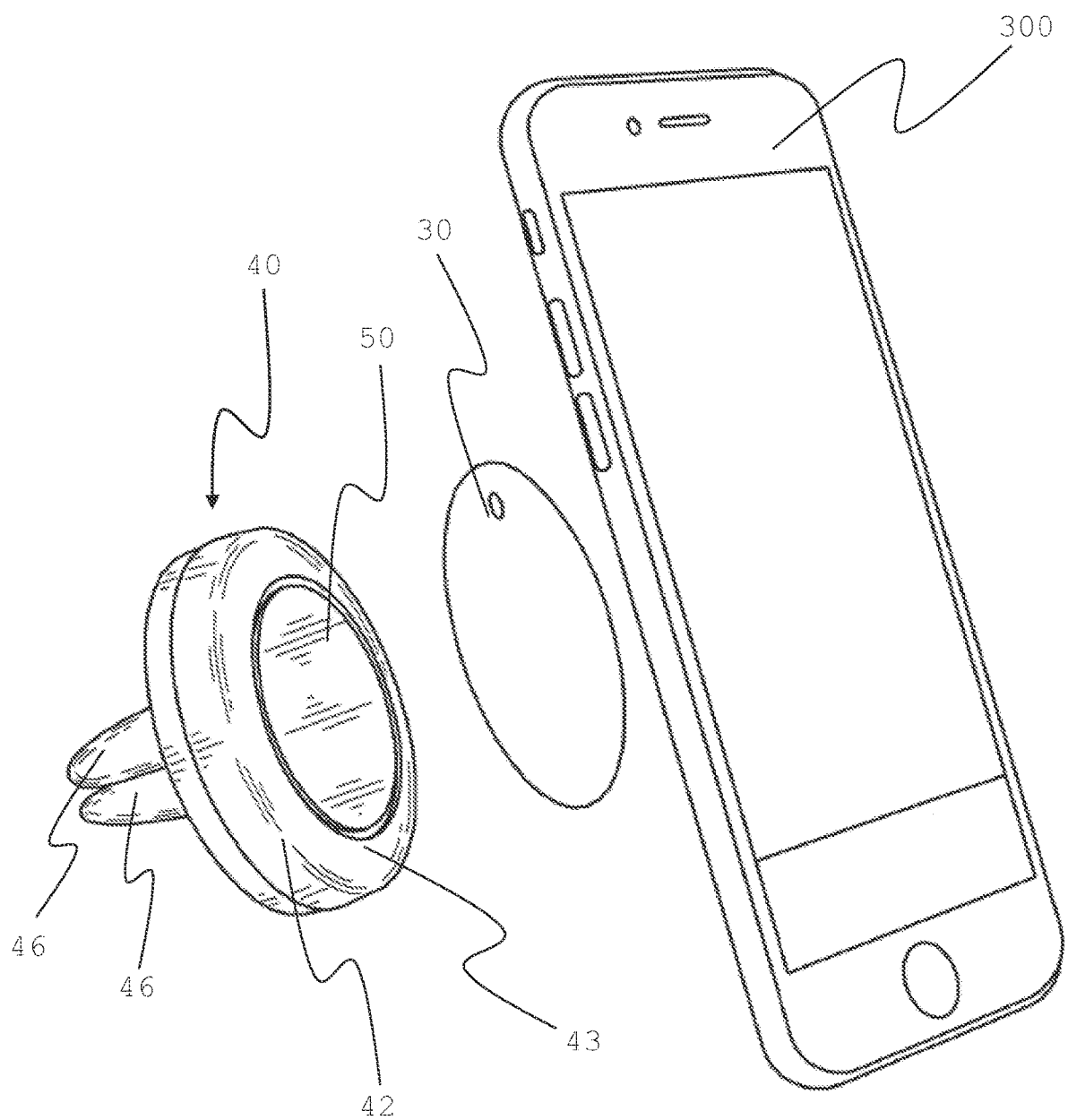
FIG. 12 shows a schematic perspective view of a magnetic mount illustrating magnetic attraction between the support and the metal plate to support or retain an electronic device according to the invention for magnetic mount.

FIG. 12 shows a schematic perspective view of the magnetic mount (200) illustrating magnetic attraction between the support (40) and the metal plate (30) to support or retain the electronic device (300).

The support (40) comprises a body (42) and a plurality of legs (46), wherein the body (42) is substantially in a form of a geometric prism or cylinder which has two bases (43, 44) facing each other wherein the legs (46) are attached to one (44) of the two bases (43, 44), wherein the magnet (50) is placed in the body (42). One base (43) of the support (40) has a flat surface to be magnetically attached to the case (100).

The body (42) is substantially in a shape of a prism, a right prism, a uniform prism, or cylinder. Preferably, the body is substantially cylindrical or substantially in a shape of a right prism having two bases of regular convex and rectangular sides, for example, regular hexagon right prism, regular octagon right prism, or the like.

When the case (100) is magnetically retained by the support (40), the base (43) of the body (42) and an outer surface (22) of the hard protective frame (20) create enough friction to prevent the case (100) from sliding on the base (43). To create such friction, the surface of the base (43) may be rough.

Figure 13:
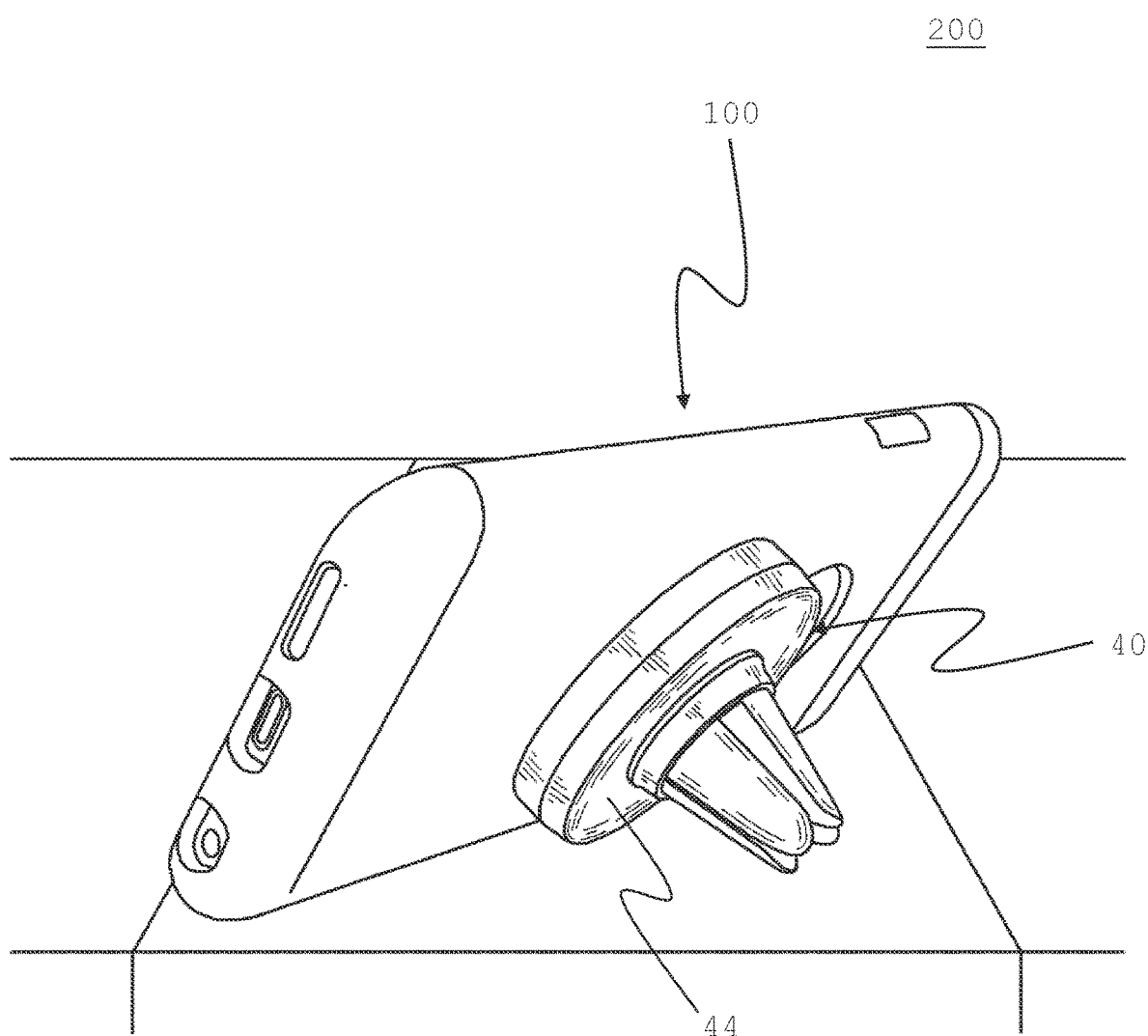
FIG. 13 shows a perspective view of the magnetic mount having the case and the support such that the support magnetically attracts and retains the case so that the case can stand on a flat surface.
Figure 14:
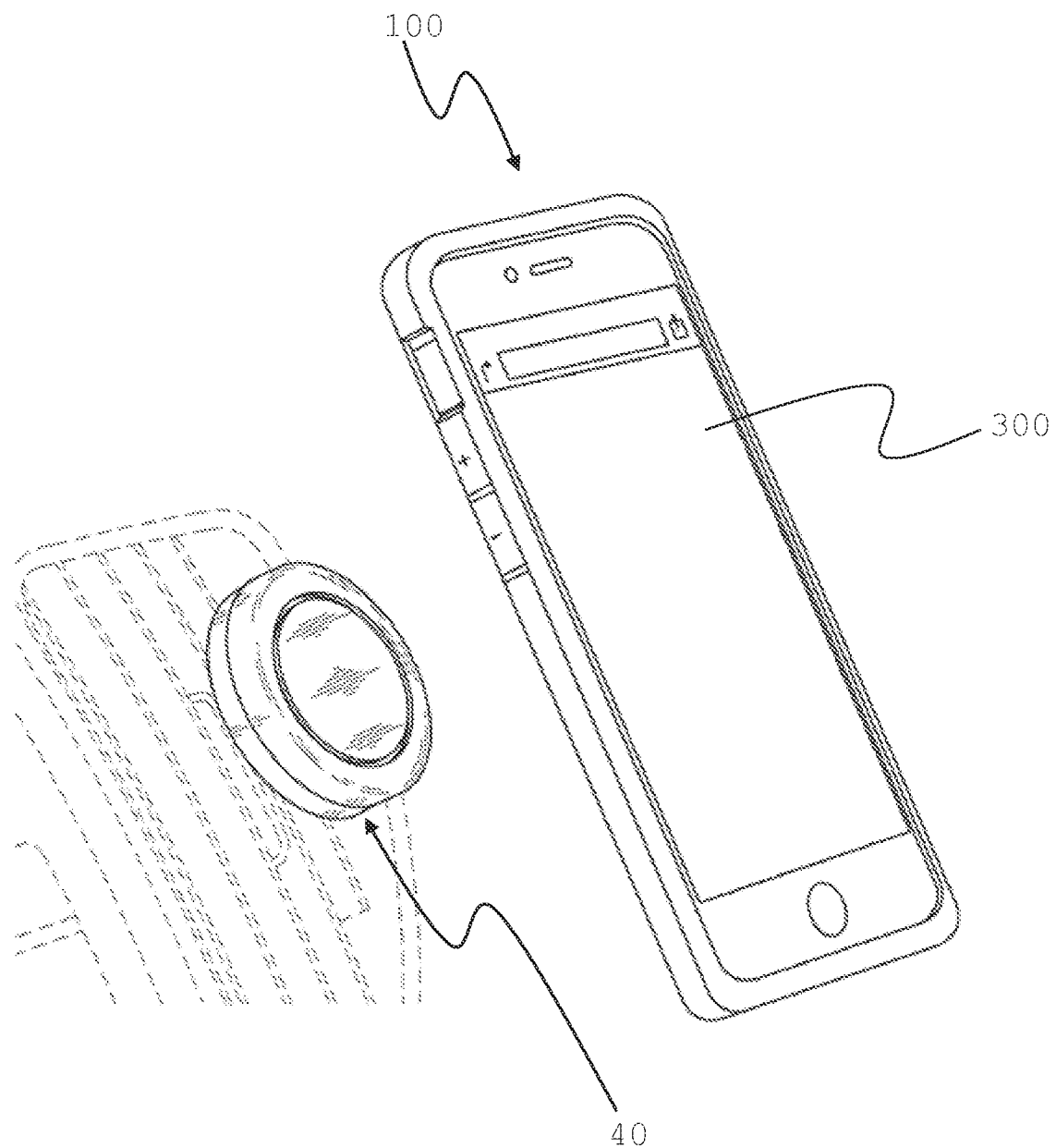
FIG. 14 shows a perspective view of the magnetic mount having the case and the support such that the support magnetically attracts and retains the case and the support is inserted and securely retained by an air vent of a vehicle.

FIG. 13 shows a perspective view of the magnetic mount (200) such that the support (40) magnetically attracts and retains the case (100) so that the case (100) can stand on a flat surface. FIG. 14 shows a perspective view of the magnetic mount (200) such that the support (40) magnetically attracts and retains the case (100) and the support (40) is inserted into and securely retained by an air vent of a vehicle which is comprised of parallel vanes.

The plurality of legs (46) of the support (40) are configured to support the case (100) magnetically retained by the support (40) so that the case (100) stands on a flat surface. When the case (100) is magnetically retained by the support (40), the case (100) can stand on a flat surface and the angle between the case (100) and the flat surface can be adjusted by adjusting the location of the support (40) with respect to the case (100). The adjusted location can be maintained. The friction between the case (100) and the support (40) should be weak enough to allow such location adjustment, but strong enough to prevent slipping of the case (100) away from the support (40).

In addition, the plurality of legs (46) of the support (40) is constructed to be received and retained by an air vent of a vehicle. FIG. 14 shows the support (40) inserted into and retained by the air vent of a vehicle. By the magnetic attraction between the support (40) and the case (100), the case (100) can be mounted onto the air vent of a vehicle. The support (40) is detachably fixed to the air vent and the case (100) can rotate or slide a little with respect to the support (40). Because of friction between the support (40) and the case (100), adjusted rotation or sliding of the case (100) can be maintained so that a user can adjust the angle of the case (100) suitable and convenient for him.

Preferably, the metal plate (30) is made of ferromagnetic material and the magnet (50) produces magnetic flux. More specifically, the metal plate (30) may be made of steel, stainless steel, or iron. As in FIGS. 15 and 16, the metal plate (30) may be made of ferromagnetic metal plate.

The metal plate (30) is close enough to an outer surface (22) of the hard protective frame (20) and the magnet produces enough magnetic flux so that the support (40) attracts and retains the case (100) with the electronic device (300) installed therein in place.

Additionally, the support (40) and the case (100) create enough friction to prevent the case (100) from sliding on or slipping from the support (40) when the case (100) is magnetically retained by the support (40).

Alternatively, the magnet (50) may be made of ferromagnetic material and the metal plate (30) may be made of a magnet which produces magnetic flux.

Figure 15:
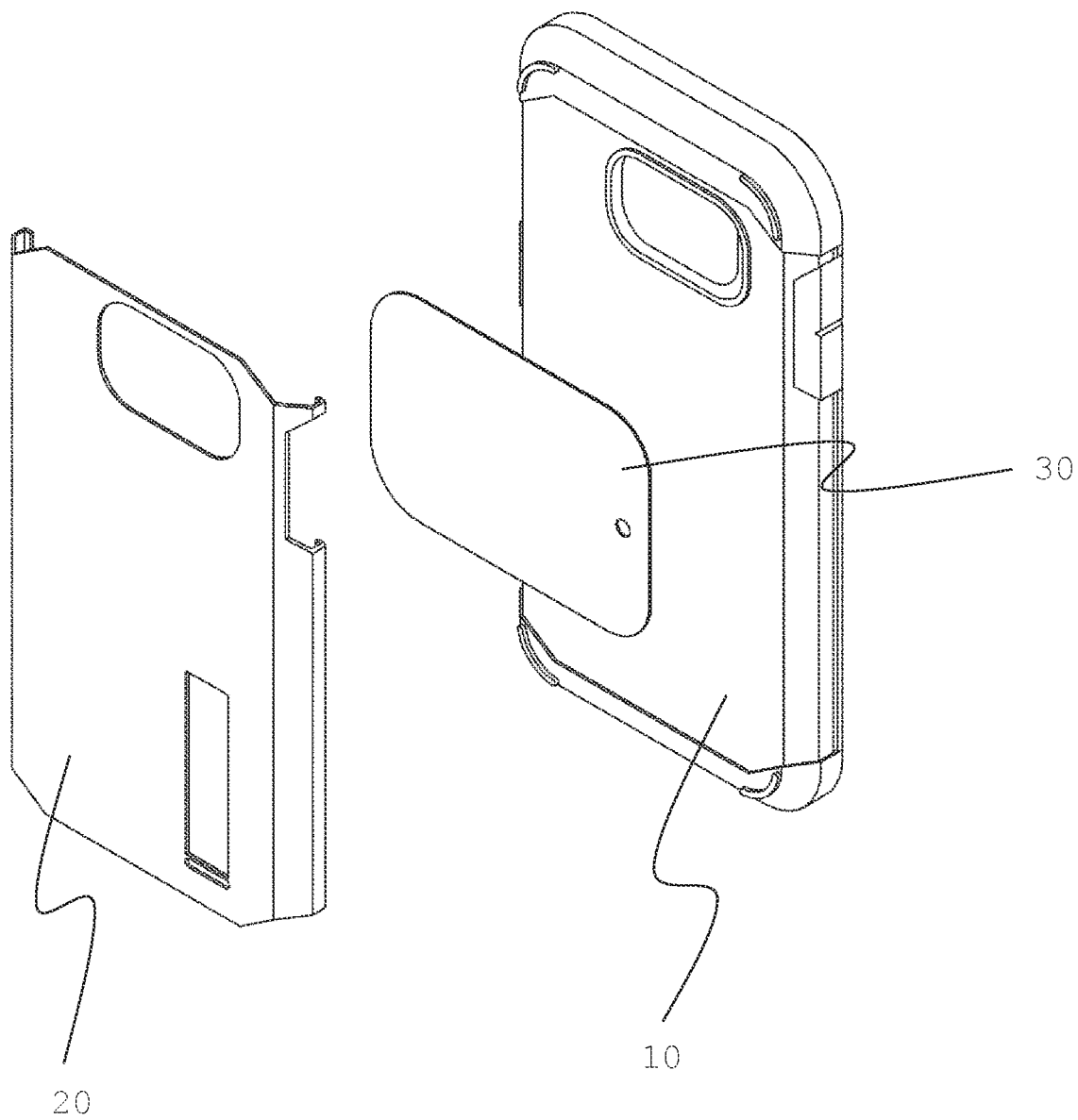
FIG. 15 shows another exploded view of the case having the soft protective cover, the hard protective frame and the metal plate according to the invention for magnetic mount.
Figure 16:
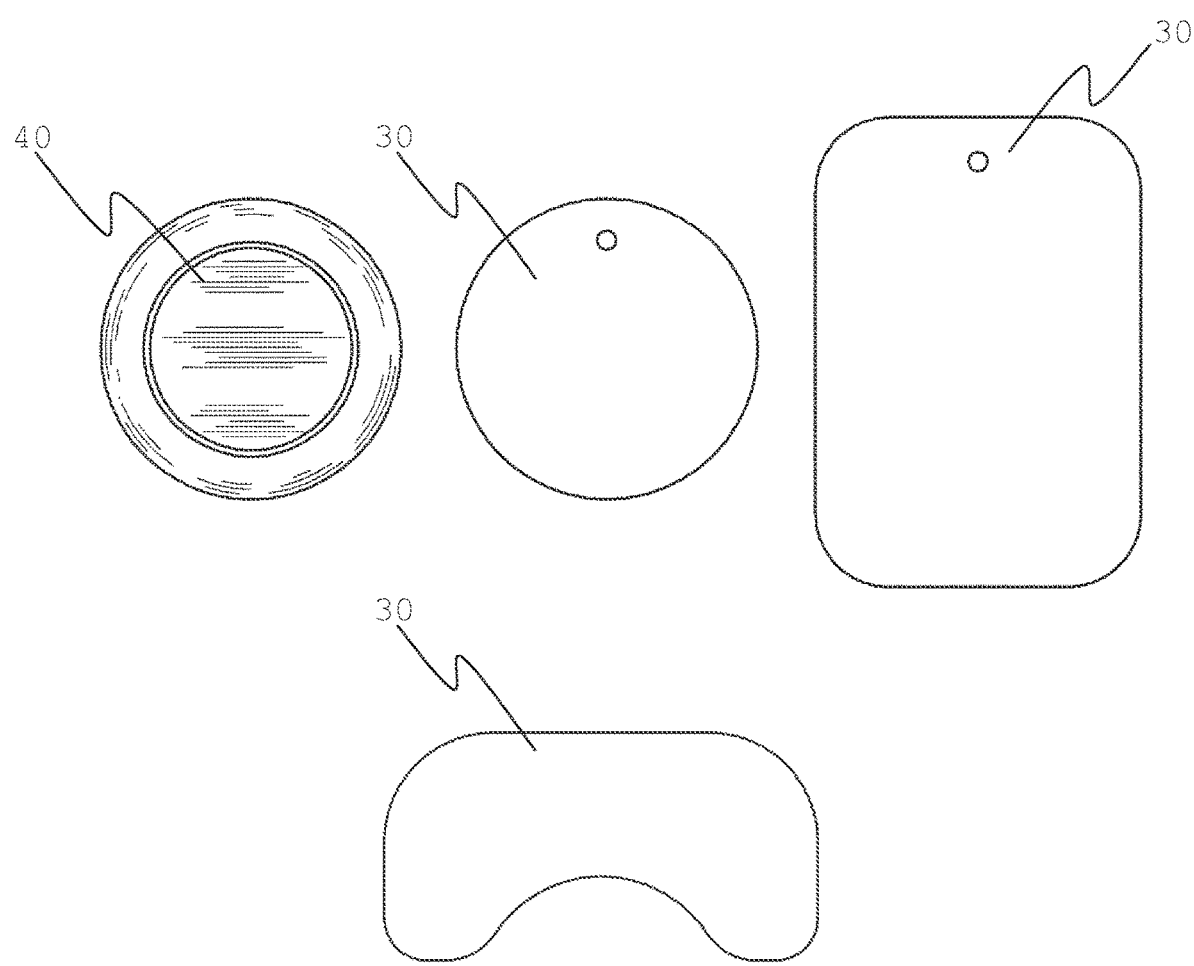
FIG. 16 shows the support, the metal plate shaped to be circular, the metal plate shaped to be rectangular, and the metal plate shaped according to the present invention.

The body (42) of the support (40) may be geometrically a prism or cylinder. More preferably, the body (42) is substantially cylindrical as FIG. 12 or FIG. 13. Cylindrical shape is preferable in rotating the support (40) or case (100) with respect to each other. The plurality of legs (46) is attached about a center of the base (44) and preferably, there are four legs (46). Four legs (46) may form a square layout so that they can be easily inserted into an air vent of a vehicle. The metal plate (30) may be a circular metal plate or a rectangular metal plate, as shown in FIGS. 15 and 16, or a substantially rectangular or substantially trapezoidal plate as shown in FIGS. 1 and 3.

The soft protective cover (10) is made of soft material and the hard protective frame (20) is made of hard material. Preferably, the soft protective cover (10) is made of thermoplastic polyurethane and the hard protective frame (20) is made of polycarbonate.

As shown in FIG. 11, the soft protective cover (10) comprises a longitudinal recess (15) and the hard protective frame (20) comprises a longitudinal protrusion (25) such that the longitudinal recess (15) of the soft protective cover (10) receives the longitudinal protrusion (25) of the hard protective frame (20) therein for secure coupling between the soft protective cover (10) and the hard protective frame (20).

The soft protective cover (10) is sufficiently flexible to accept insertion of the electronic device (300) therein and sufficiently rigid to securely retain the inserted electronic device (300).

The magnetic mount (200) may further comprise a double-sided adhesive for attaching the metal plate (30) either to the soft protective cover (10) or to the hard protective frame (20). The double-sided adhesive may be a double-sided adhesive tape or sheet.

If the soft protective cover (10) has a recess (not shown) formed on the back panel (12) to receive the metal plate (30), the double-sided adhesive may be located in the recess to attach the metal plate (30) to the soft protective cover (10). The double-sided adhesive may be a double-sided adhesive tape or sheet.

If the hard protective frame (20) has a recess to receive the metal plate (30), the double-sided adhesive may be located in the recess to attach the metal plate (30) to the hard protective frame (20).

Alternatively, the magnetic mount (200) may further comprise two double-sided adhesives one of which is for attaching the metal plate (30) to the soft protective cover

(10) and the other of which is for attaching the first metal plate (30) to the hard protective frame (20). In case that the soft protective cover (10) has a first recess formed on the back panel (12) and the hard protective frame (20) has a second recess, and the first and second recesses form a housing to receive the metal plate (30) therein, two double-sided adhesives may be located in both of the recesses for attaching the metal plate (30) to the soft protective cover (10) and the hard protective frame (20).

The metal plate (30) may be attached either to the soft protective cover (10) or to the hard protective frame (20) by an adhesive such as glue, bond, paste, tape, double-sided adhesive, etc. The double-sided adhesive may be a double-sided adhesive tape or sheet.

In the alternative embodiment, a magnetic mount (200) for an electronic device (300) may comprise: a case (100) for receiving an electronic device therein; a metal plate (30) attached to a back of the case (100) by an adhesive; and a support (40) having a magnet (50). The metal plate (30) and magnet (50) are magnetically attractable to each other for magnetically attracting and retaining the case (100) to the support (40). The adhesive may be glue, bond, paste, tape, double-sided adhesive, etc. The metal plate (30) may be circular, rectangular, substantially circular, substantially rectangular or substantially trapezoidal.

The metal plate (30) may be made of ferromagnetic material and the magnet (50) may be made of a magnet which produces magnetic flux. More specifically, the metal plate (30) may be made of steel, stainless steel, or iron. Preferably, the metal plate (30) may be made of ferromagnetic metal plate.

Alternatively, the magnet (50) may be made of ferromagnetic material and the metal plate (30) may be made of a magnet which produces magnetic flux. Still in the alternative embodiment of the present invention, a magnetic mount (200) for an electronic device (300) comprises: a metal plate (30) to be attachable to a back of the electronic device (300) by an adhesive; and a support (40) having a magnet (50). The metal plate (30) and the magnet (50) are magnetically attractable to each other for magnetically attracting and retaining the case (100) to the support (40). In addition, one side of the adhesive is attached to the metal plate (30).

The metal plate (30) may be made of ferromagnetic material and the magnet (50) may be made of a magnet which produces magnetic flux. The magnet produces enough magnetic flux so that the support (40) attracts and retains the electronic device (300). The support (40) and the metal plate (30) create enough friction to prevent the metal plate (30) from sliding on the support (40) when the electronic device (300) is magnetically retained by the support (40).

Another side of the adhesive may be covered with a release tape so that after removing the release tape, the another side of the adhesive can be attached to the back of the case.

The adhesive may be glue, bond, paste, tape, double-sided adhesive, or the like known in the art, but preferably, the adhesive is a double-sided adhesive. The double-sided adhesive may be a double-sided adhesive tape or sheet.

Figure 17:
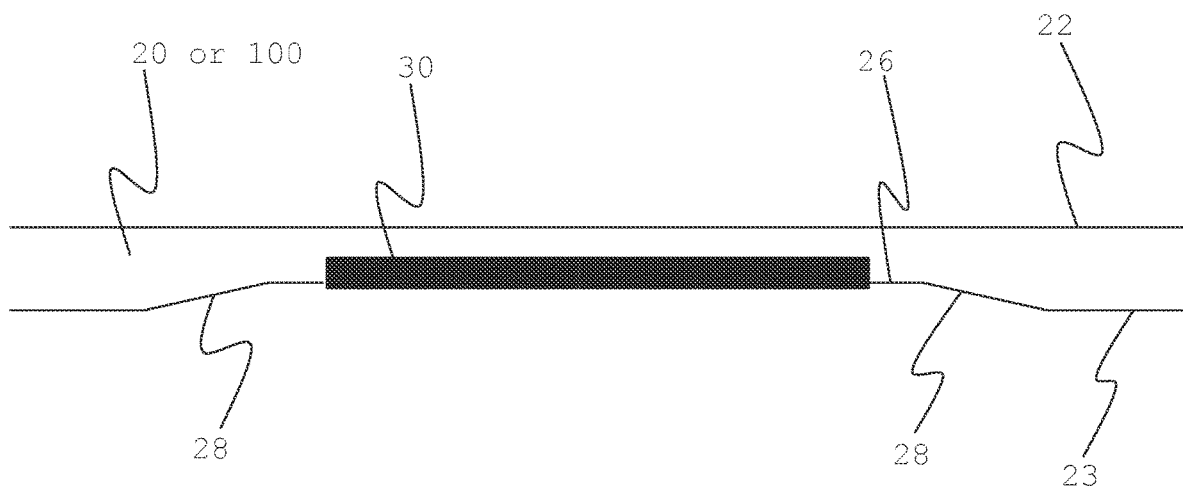
FIG. 17 shows alternative cross sectional view of the case or the hard protective frame.

FIGS. 11 and 17 show cross-sectional views of the present invention. The embodiment of FIG. 11 is explained above and the embodiment of FIG. 17 further comprises a surrounding recess (28).

In this embodiment, the hard protective frame (20) has a recess (26) to receive the metal plate (30) therein, and the hard protective frame (20) may further comprise a surrounding recess (28) which surrounds the recess (26) and slopes away from a flat surface (23) of the hard protective frame (20) to the recess (26) creating a cavity.

Figure 18:
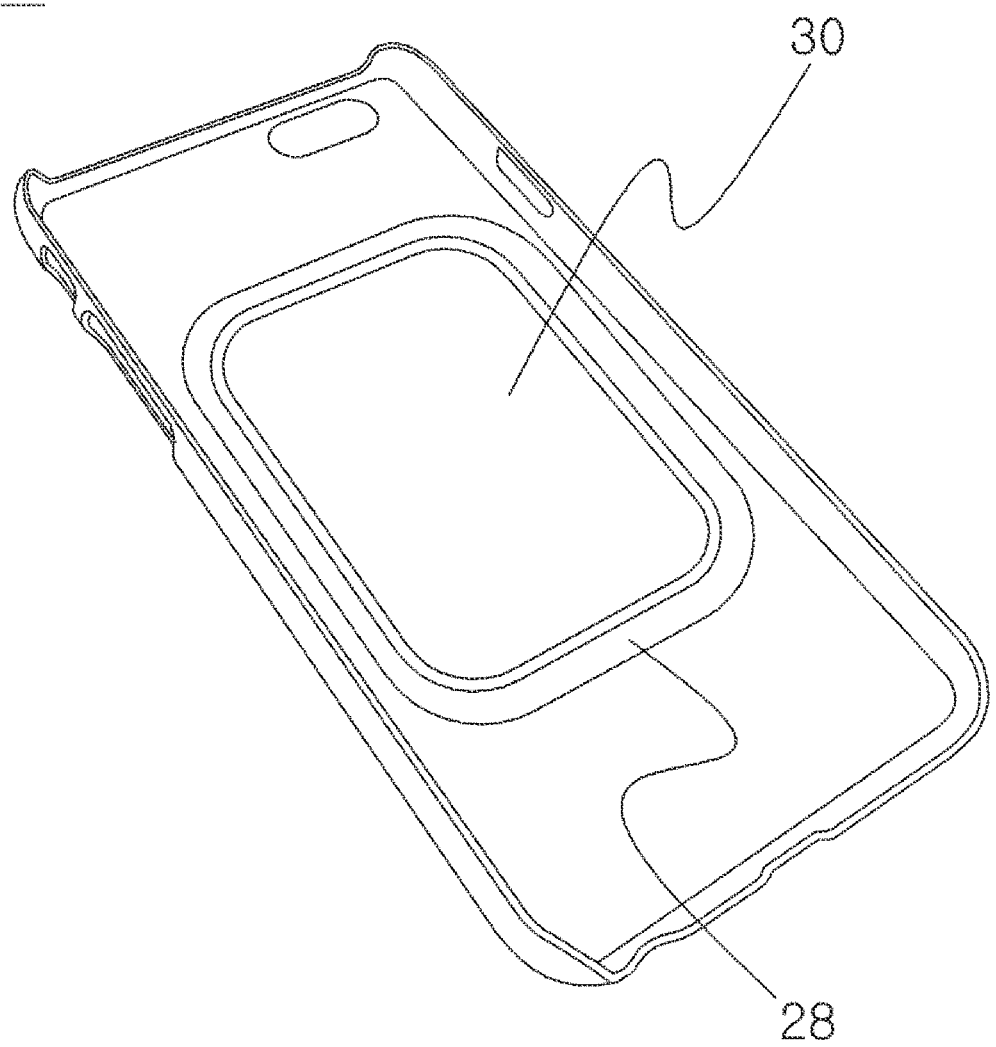
FIG. 18 shows a perspective view of the case or the hard protective frame having the cross-sectional view of FIG. 17.

In the alternative, the case (100) may comprise a recess (26), formed on its back (23) facing the electronic device (300), for receiving the metal plate (30) therein, and the case (100) may further comprise a surrounding recess (28) which surrounds the recess (26) and slopes away from a flat surface (23) of the case (100) to the recess (26) thereby creating a cavity. FIG. 18 shows a drawing of the case (100) according to this embodiment.

In FIG. 18, the recess (26) is formed on the inner surface (23) of the case (100) and the surrounding recess (28) is formed along the outer boundary of the recess (26) to surround the recess (26). The surrounding recess (28) may gradually recess from a flat surface (23) of the case (100) (or the hard protective frame (20)) to the recess (26). As shown in FIG. 17, the surrounding recess (28) gradually recesses and becomes flat toward the recess (26).

The metal plate (30) may be flush with the recess (26) or slightly protrude out of the recess (26). In other words, the height of the metal plate (30) may be about or slightly greater than the depth of the recess (26). However, the metal plate (30) does not protrude beyond the flat surface (23) of the case (100) (or the hard protective frame (20)).

Accordingly, the surrounding recess (28) forms space between the metal plate (30) and the electronic device (300) in order to prevent scratches or damages by the metal plate (30) to the electronic device (300). In addition, without the surrounding recess (28), a boundary line of the recess (26) may be formed on the outer surface (22) of the case (100) or the hard protective frame (30) which is visible from outside. The surrounding recess (28) prevents such boundary line of the recess from being formed on the outer surface (22) and makes the part of the case (100) or the hard protective frame (20) in contact with the metal plate (30) less vulnerable to damage.

While the invention has been shown and described with reference to different embodiments thereof, it will be appreciated by those skilled in the art that variations in form, detail, compositions and operation may be made without departing from the spirit and scope of the invention as defined by the accompanying claims.

The invention claimed is:

1. A case for an electronic device having a coil for wireless charging, wherein the coil is disposed in the electronic device and has an inner boundary and an outer boundary, the case comprising:
 a protective cover configured to at least partially cover the electronic device; and
 at least one metal plate constructed to be placed in between the protective cover and the electronic device,
 wherein the at least one metal plate comprises at least one magnetic plate which is configured to produce magnetic flux to enable magnetic attachment of the case,
 wherein the at least one metal plate is positioned not to substantially block magnetic waves passing through an area formed by the inner boundary of the coil, and
 wherein the at least one metal plate is positioned not to overlap with an orthographic parallel projection of an area formed by the inner boundary of the coil when the electronic device is at least partially covered by the protective cover.

2. The case of claim 1, wherein the inner boundary and the outer boundary of the coil are substantially circular.

3. The case of claim 1, wherein the at least one metal plate is arranged to form a rounded shape having an inner boundary.

4. The case of claim 3, wherein the inner boundary of the rounded shape substantially symmetrically aligns to orthographic parallel projections of the inner boundary and the outer boundary of the coil.

5. The case of claim 3, wherein the inner boundary of the rounded shape at least partially overlaps with an orthographic parallel projection of an area formed by the outer boundary of the coil.

6. The case of claim 3, wherein the inner boundary of the rounded shape is placed outside an orthographic parallel projection of an area formed by the outer boundary of the coil.

7. The case of claim 3, wherein the inner boundary of the rounded shape is substantially circular.

8. The case of claim 1, wherein the at least one metal plate is attached to the protective cover by an adhesive or a tape.

9. The case of claim 1, wherein the at least one metal plate is attached to an inner surface of the protective cover.

10. The case of claim 9, wherein the inner surface of the protective cover has a recess in which the at least one metal plate is received.

11. The case of claim 1, further comprising a protective frame sheet attached to the at least one metal plate.

12. A case for an electronic device having a coil for wireless charging, wherein the coil is disposed in the electronic device and has an inner boundary and an outer boundary, the case comprising:
a protective cover configured to at least partially cover the electronic device; and
at least one metal plate disposed on the protective cover,
wherein the at least one metal plate comprises at least one magnetic plate which is configured to produce magnetic flux to enable magnetic attachment of the case,
wherein the at least one metal plate is positioned not to substantially block magnetic waves passing through an area formed by the inner boundary of the coil,
wherein the at least one metal plate is positioned not to overlap with an orthographic parallel projection of an area formed by the inner boundary of the coil when the electronic device is at least partially covered by the protective cover,
wherein the at least one metal plate is arranged to form a rounded shape having an inner boundary, and
wherein the inner boundary of the rounded shape is placed outside an orthographic parallel projection of an area formed by the outer boundary of the coil.

* * * * *